US011374481B2

(12) United States Patent
Amerio et al.

(10) Patent No.: US 11,374,481 B2
(45) Date of Patent: Jun. 28, 2022

(54) MAGNETIC COUPLING DEVICE

(71) Applicant: AROL S.P.A., Canelli (IT)

(72) Inventors: Diego Amerio, Canelli (IT); Marco Caffa, Canelli (IT); Marco Cipriani, Canelli (IT)

(73) Assignee: AROL S.P.A., Canelli (IT)

( * ) Notice: Subject to any disclaimer, the term of this patent is extended or adjusted under 35 U.S.C. 154(b) by 16 days.

(21) Appl. No.: 16/633,228

(22) PCT Filed: Jul. 18, 2018

(86) PCT No.: PCT/IB2018/055321
§ 371 (c)(1),
(2) Date: Jan. 23, 2020

(87) PCT Pub. No.: WO2019/021117
PCT Pub. Date: Jan. 31, 2019

(65) Prior Publication Data
US 2020/0186020 A1 Jun. 11, 2020

(30) Foreign Application Priority Data

Jul. 24, 2017 (IT) .................. 102017000084310

(51) Int. Cl.
*H02K 49/10* (2006.01)
*B67B 3/20* (2006.01)
*H02K 49/06* (2006.01)

(52) U.S. Cl.
CPC ......... *H02K 49/106* (2013.01); *B67B 3/2086* (2013.01); *H02K 49/10* (2013.01); *H02K 49/065* (2013.01)

(58) Field of Classification Search
CPC .... H02K 49/065; H02K 49/10; H02K 49/104; H02K 49/106; B67B 3/2066; B67B 3/2086
See application file for complete search history.

(56) References Cited

U.S. PATENT DOCUMENTS 3,771,285 A 11/1973 Bertario
4,535,583 A 8/1985 Tanaka et al.
(Continued)

FOREIGN PATENT DOCUMENTS

CN 2937089 Y 8/2007
CN 201309820 Y 9/2009
(Continued)

OTHER PUBLICATIONS

International Search Report and Written Opinion of the International Searching Authority dated Sep. 12, 2018 for International Patent Application No. PCT/IB2018/055321.

*Primary Examiner* — Burton S Mullins
(74) *Attorney, Agent, or Firm* — Howson & Howson LLP

(57) ABSTRACT

A magnetic coupling device (1) is provided for coupling a first member (10) and a second member (11), coaxial with each other, so that they can jointly rotate about a common axis and/or translate along such axis or can perform relative rotary and/or translatory movements depending on the intensity of a torque or an axial force applied to one of the members. At least one of the members (10) has axially extending magnetized areas (12) each consisting of a row of axially aligned magnets (12'), the magnets (12') in one area (12i) being axially offset relative to the magnets of an adjacent area (12j).

9 Claims, 3 Drawing Sheets

(56) References Cited

U.S. PATENT DOCUMENTS

| | | |
|---|---|---|
| 4,808,869 A | 2/1989 | Kopp |
| 5,313,765 A | 5/1994 | Martin |
| 7,946,398 B2 | 5/2011 | Felber et al. |
| 8,205,413 B2 | 6/2012 | Kramer et al. |
| 8,375,682 B2 | 2/2013 | Zanini et al. |
| 8,375,683 B2 * | 2/2013 | Knieling ............... B67B 3/2086 53/317 |
| 8,448,800 B2 | 5/2013 | Konrad |
| 8,561,377 B2 | 10/2013 | Cirio |
| 9,623,990 B2 | 4/2017 | Cirio |
| 9,694,923 B2 * | 7/2017 | Schoenfelder ........ B65B 7/2871 |
| 11,121,612 B2 | 9/2021 | Cipriani |
| 11,121,616 B2 | 9/2021 | Cipriani |
| 11,192,767 B2 | 12/2021 | Caffa et al. |
| 11,242,235 B2 | 2/2022 | Caffa et al. |
| 2010/0077706 A1 | 4/2010 | Cirio |
| 2019/0248636 A1 | 8/2019 | Caffa et al. |
| 2020/0087129 A1 | 3/2020 | Caffa et al. |
| 2021/0148405 A1 | 5/2021 | Amerio et al. |

FOREIGN PATENT DOCUMENTS

| | | |
|---|---|---|
| CN | 203373122 U | 1/2014 |
| CN | 103693597 A | 4/2014 |
| CN | 104961078 A | 10/2015 |
| CN | 105515335 A | 4/2016 |
| CN | 106006511 A | 10/2016 |
| DE | 2650294 A1 | 5/1978 |
| DE | 3807083 A1 | 9/1989 |
| DE | 102007037186 B3 | 10/2008 |
| EP | 1186873 A1 | 3/2002 |
| GB | 1530756 | 11/1978 |
| JP | H09-280341 A | 10/1997 |
| WO | 2009/019001 A2 | 2/2009 |
| WO | 2011/110606 A1 | 9/2011 |

\* cited by examiner

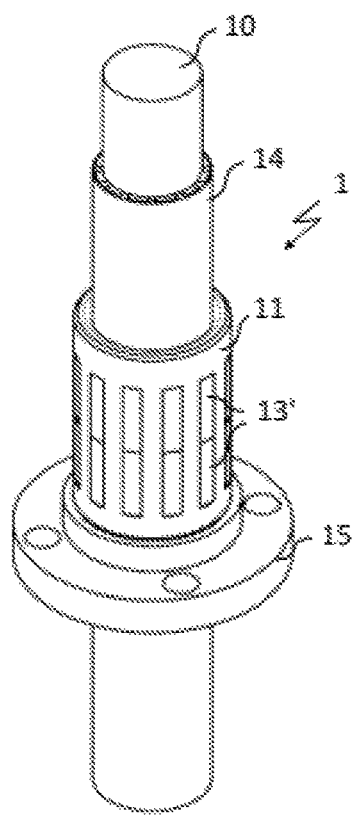
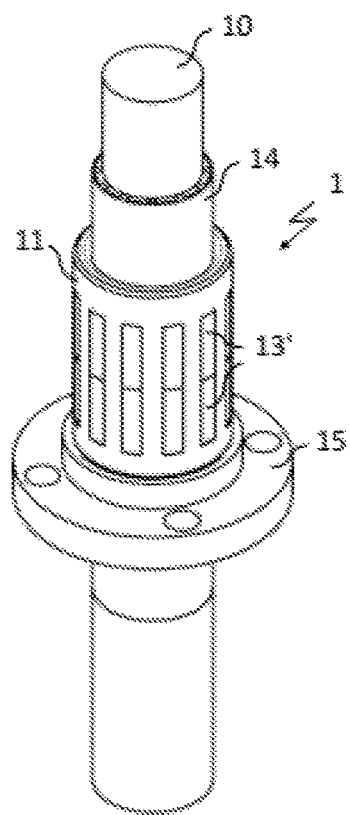
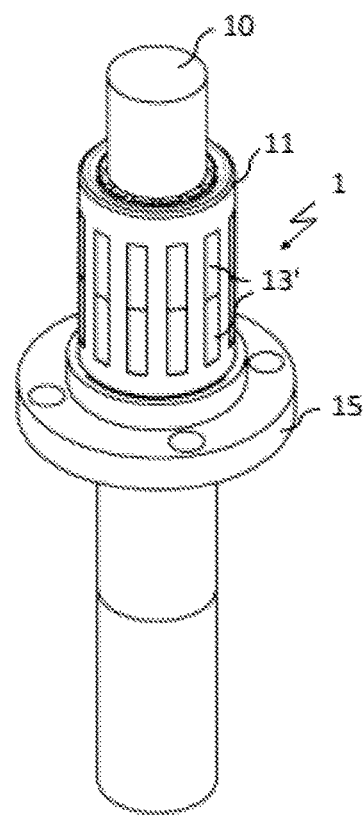
FIG. 5A      FIG. 5B      FIG. 5C
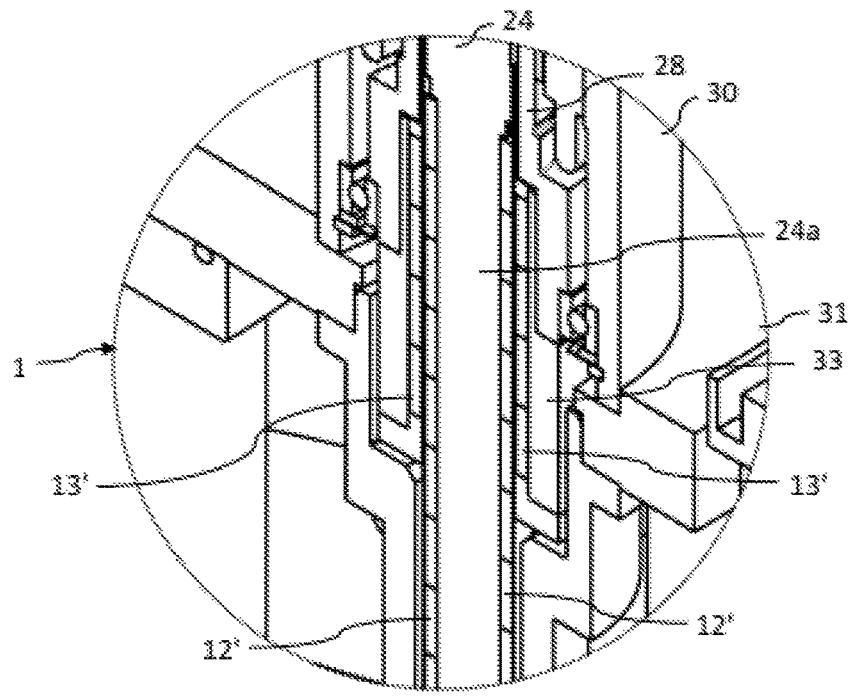
FIG. 8

MAGNETIC COUPLING DEVICE

TECHNICAL FIELD

This invention relates to the devices for transmitting a rotary motion among a plurality of members, and more particularly it concerns a magnetic coupling device.

BACKGROUND OF THE INVENTION

In many technical fields, the need exist to transmit a rotary motion among two or more members, while possibly allowing at the same time also a relative translation thereof.

Many transmission devices of this kind are mechanical devices. Considering for the sake of simplicity two members, one of them is usually connected to the source of rotary motion and can drive the other member into rotation by means of an element capable of longitudinally displacing on the latter. Such devices require a physical contact between the parts in relative movement, and this originates a number of problems, concerning in particular the alignment of the axes, the working tolerances, the need for lubrication and the wear of the components. Indeed, as well known, the alignment of the axes and the working tolerances are particularly critical issues, and the wear of the components can alter the system performance. Moreover, the presence of lubricants and powders generated by the abrasion of the contacting parts makes mechanical devices unsuitable for applications in which a clean environment is an indispensable requirement.

In order to obviate the drawbacks of mechanical devices, magnetic coupling devices have already been proposed, in which no contact occurs between the parts in relative movement.

An example is disclosed in Japanese Published Patent Application JP H 9280341 A. This application discloses a device for transmitting rotation from a driving shaft to a driven shaft, which shafts are coaxially arranged and have, on their facing surfaces, a plurality of axially extending magnetized areas, each area having the same polarity over the whole of its axial extension. The driven shaft is carried by a slide allowing it to slide relative to the driving shaft. Each magnetized area can consist of a row of axially aligned magnets, and the magnets in different rows on each shaft form bands perpendicular to the axis of the respective shaft.

An arrangement of this kind has the drawback that the ends of the individual magnet bands give rise to preferential stability positions, whereby the axial movement occurs stepwise. This makes the prior art system unsuitable for applications in which a continuous linear relative movement is required between the elements of the coupling.

DESCRIPTION OF THE INVENTION

It is an object of the invention to provide a magnetic coupling device that obviates the drawbacks of the prior art.

According to the invention, this is obtained in that, in a device which includes at least one driving member and one driven member coaxially arranged and in which at least one of said members has axially extending magnetized areas consisting of a plurality of axially aligned magnets, the magnets in one area have ends axially offset relative to the magnets of the adjacent area.

In a coupling device for transmission of both a rotary and a translatory motion, the magnets can be elongated magnets having the same polarity and located adjacent to one another in the respective area or row.

In a coupling device for transmission of rotary motion only, the magnets in the different areas or rows can be arranged in an echelon configuration. In this case, a magnet in a row has opposite polarity with respect to both the preceding and the following magnet in the same row and the neighboring magnets in the adjacent rows.

The magnets can be provided on both members, or one member can have the magnetized areas and the other can be made of a material having magnetic hysteresis properties (hysteretic material).

The invention also provides a capping head for applying for instance screw or pressure caps to containers, wherein a cap application part can be driven according to a rotary movement about a longitudinal axis and a translatory movement along said axis through a magnetic coupling device according to the invention.

According to a further aspect of the invention, there is also provided a turret of a capping machine, including a plurality of capping heads according to the invention mounted on a rotating structure of the turret and fixedly connected for rotation to said structure.

BRIEF DESCRIPTION OF THE FIGURES

The above and other features and advantages of the invention will become apparent from the following description of preferred embodiments made by way of non-limiting example with reference to the accompanying drawings, in which:

FIGS. 5A to 5C show the coupling device depicted in FIGS. 1 and 2 in different relative positions of the two rotors;

FIG. 8 is an enlarged view of the region of the capping head where the magnetic coupling device is formed.

DESCRIPTION OF PREFERRED EMBODIMENTS

Figure 1:
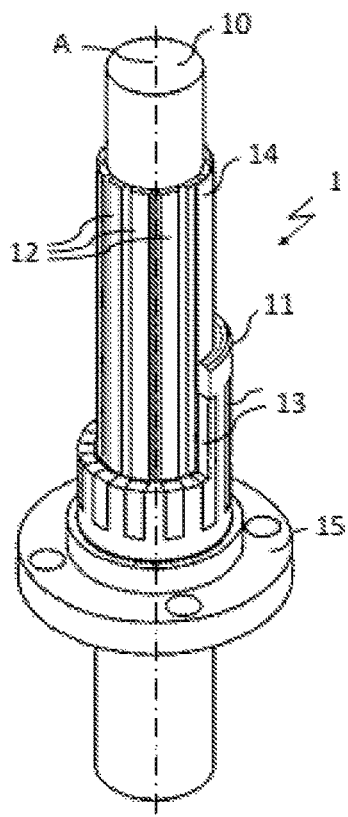
FIG. 1 shows an exemplary embodiment of a roto-translating coupling device according to the invention.
Figure 2:
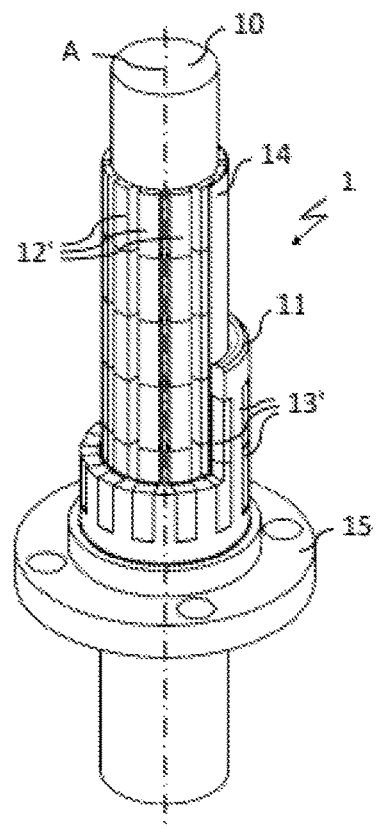
FIG. 2 is a view similar to FIG. 1, showing a different configuration of the magnets on the two rotors to be coupled.

Referring to FIGS. 1 and 2, a roto-translating magnetic coupling device according to the invention is generally denoted 1. Device 1 consists of an inner cylindrical rotor 10 and an outer cylindrical rotor 11, coaxially mounted on inner rotor 10 and preferably having a smaller length than the latter. Reference symbol A denotes the longitudinal axis of both rotors.

In device 1, rotors 10 and 11, besides performing a rotary motion, are also translatable relative to each other. Possibly, they can be guided in their rotary and translatory movements by rolling bearings and sliding bushings, or by bushings enabling both movements at the same time. The sliding bushings can even be dispensed with. For the sake of simplicity of the drawing, such guiding means have not been shown. On the other hand, they are not part of the invention and are wholly conventional and well known to the skilled in the art, so that a detailed description thereof is not necessary.

By way of example and for the sake of simplicity of description, hereinafter it will be assumed that outer rotor 11 receives the roto-translatory motion from external driving members and is to transmit such a motion to inner rotor 10. To this end, rotor 11 has a flange 15 for fastening to devices controlling the movement (not shown). However, it is also possible that the external driving members apply the rotary motion to one rotor and the translatory motion to the other rotor.

In the example shown in FIG. 1, rotors 10 and 11 have, on their facing surfaces, a plurality of elongated magnets 12 and 13, respectively, which extend in axial direction and are distributed over substantially the whole circumference of inner rotor 10 and outer rotor 11. In this example, each magnet 12, 13 is made of a single element. Magnets 12 and 13 can be elements applied to inner rotor 10 and outer rotor 11, and they are attached to the rotors in any suitable manner, for instance by gluing. Advantageously, magnets 12 and 13 are magnetized in radial direction and are arranged with alternating polarities. The two sets of magnets can comprise the same or a different number of magnets, depending on the application. Taking into account the greater length of inner rotor 10 with respect to outer rotor 11, also magnets 12 on inner rotor 10 will have a greater length than magnets 13 on outer rotor 11. The gap between facing magnets 12, 13 is such as to ensure a high magnetic force transmission between the rotors and the absence of contact also during operation. A sleeve 14 with smooth surface, made for instance of a non-magnetic material, is located between the two magnet sets. Such a sleeve serves to contain magnets 12 and to protect them from contamination, as well as to reduce fluid turbulence at the air gap. Moreover, the smooth surface makes sliding between outer rotor 11 and inner rotor 10 easier.

In the example shown in FIG. 2, each long magnet 12 in rotor 10 is made of a row of short magnets 12' that are radially polarised in the same direction, are axially aligned and are adjacent to one another. Of course, the construction with rows of axially aligned short magnets is possible also for the magnets in outer rotor 11, as shown by magnets 13' in FIG. 2. Advantageously, also magnets 12', 13' are elements applied, e.g. glued, to the surfaces of rotors 10, 11.

Figure 3:
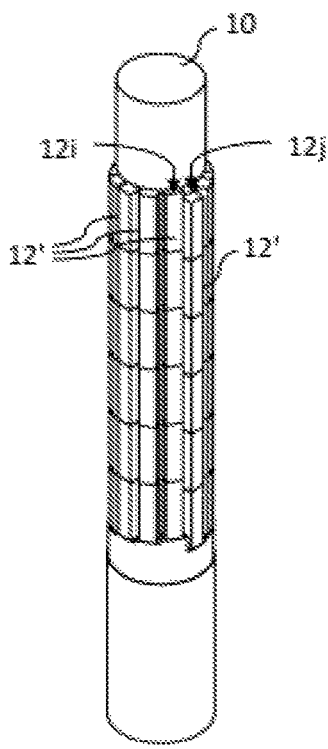
FIG. 3 shows a variant of the magnet configuration depicted in FIG. 2.

According to an advantageous embodiment of the invention, the individual short magnets 12' in the different rows can be mutually offset so that their ends are not aligned to form a circumference perpendicular to the rotor axis, as shown in FIG. 3 for magnet rows 12i, 12j. The reasons for the offset arrangement will become apparent from the sequel of the description.

Figure 4:
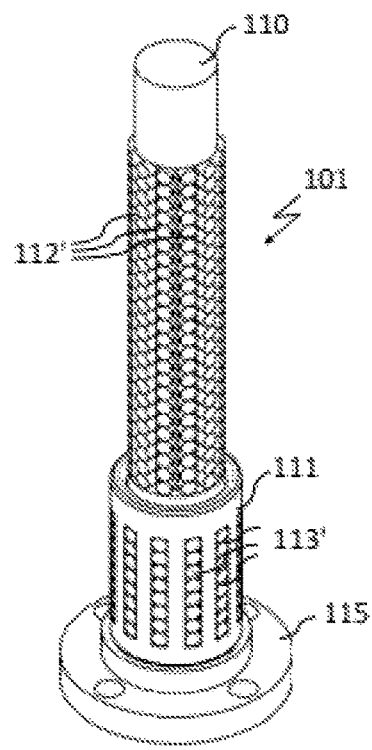
FIG. 4 shows another possible configuration of the magnets on the rotors of a coupling device intended for transmitting the rotary motion only.

FIG. 4 shows another offset arrangement of the magnets in case of a coupling device 101 intended to transmit the only rotary motion. In this Figure, reference numerals corresponding to those used in FIG. 2, increased by 100, have been used. In device 101, parallel rows of magnets 112', 113' are still provided on rotors 110, 111, but the magnets, instead of having an elongated shape, have substantially the same size in both perpendicular directions, when viewed in plan, and are arranged in echelon over substantially the whole circumference of the rotors. Adjacent magnets 112', 113' are arranged in the echelon with alternating polarities, both along a row and among contiguous rows. Magnets 112', 113' could even be located at a certain distance from one another, instead of being substantially in mutual contact as shown in the Figure.

In accordance with further embodiments, it is possible to envisage a coupling device with magnets having an elongated shape, as in FIG. 2, and arranged in echelon, or yet a coupling device with magnets having, when viewed in plan, substantially the same size in both perpendicular directions, as in FIG. 4, and arranged in rows of magnets that are radially polarised in the same direction and are polarised in opposite direction with respect to the magnets of adjacent rows.

Generally, the magnets can have further shapes, provided such shapes are compatible with the aim of the present invention.

The arrangement shown in FIGS. 1 to 4 relates to a coupling device using synchronous magnets. Yet, the invention could also be applied in a hysteresis coupling device, in which one of the two rotors is provided with permanent magnets 12 (12', 112') and 13 (13', 113'), respectively, and the other one is made of a ferromagnetic material having magnetic hysteresis properties, for instance alnico. Other materials having magnetic hysteresis properties are well known to the skilled in the art.

The operation of coupling device 1 will now be described, assuming by way of example, as stated above, that outer rotor 11 is the driving unit connected to external driving members, and inner rotor 10 is the driven unit.

As well known, when inner rotor 10 is introduced into outer rotor 11, the two rotors will become aligned with opposing polarities.

By actuating outer rotor 11 so that it performs a roto-translatory movement, as far as rotation is concerned, torque will be transferred to inner rotor 10 until a maximum torque, set in known manner at the assembling of the device, is exceeded. Thereafter, the coupling device behaves as a magnetic clutch. This effect results in tangential stepwise movements in the embodiment with synchronous magnets, and in a gradual and dampened movement in the hysteresis coupling device.

As far as translation is concerned, outer rotor 11 drags inner rotor 10 with itself until a threshold axial force, it too set in known manner at the assembling of the device, is exceeded. Once that threshold has been exceeded, outer rotor 11 (which, in the example considered, has a smaller length than inner rotor 10) can slide along the common axis over the whole length of magnets 12 of inner rotor 10, thereby continuously transmitting the torsion torque to inner rotor 10 over the whole length of magnets 12. FIGS. 5A to 5C show three relative positions of the two rotors, more particularly two extreme positions in which the magnets of outer rotor 11 are aligned with the lower end (FIG. 5A) or the upper end (FIG. 5C) of magnets 12, and an intermediate position between such ends (FIG. 5B). When the heads of magnets 13 of rotor 11 reach the ends of magnets 12 of inner rotor 10 (and hence the rotors are in the position shown in FIG. 5A or 5C), magnets 13 find a stability point and stop their longitudinal movement. Thus, a stop function is obtained without the need to provide a mechanical stop to prevent the rotors from slipping off from each other. If an axial longitudinal force is applied on rotor 11 to push it out of the stability position, a reaction effect similar to the effect caused by a spring occurs.

If magnets 12 are made as axial rows of short magnets 12' adjacent to one another and arranged so as to form bands perpendicular to axis A, as shown in FIG. 2, the stability points are the ends of individual magnets 12', whereby the translatory movement of rotor 11 would take place by discrete steps. This drawback is obviated by the arrangement shown in FIG. 3, where short magnets 12' in adjacent rows are offset, so that a succession of stability positions no longer exists at the circumferences passing through the ends of magnets 12'. The movement of rotor 11 is therefore continuous.

Adoption of such a solution results in a function of magnetic self-centering of rotors 10, 11, which are subject to opposing radial forces that cancel each other, whereby rolling bearings are not necessary since the two rotors fluctuate on each other thanks to the natural magnetic levitation.

In the case of device 101 shown in FIG. 4, with permanent magnets 112', 113' arranged in echelon, only torque transmission between rotors 110, 111 is possible, and a synchronisation and stability effect is obtained until the rotational magnetic threshold is attained. In other words, the rotary movements take place between discrete stability positions, each given by the alignment between a magnet on one rotor and a magnet with opposite polarity on the other rotor. Also in this case, a movement by discrete steps takes place. This can be obviated by a hysteresis coupling device, in which only one of rotors 110, 111 has the magnets arranged in echelon, whereas the other rotor is made of a hysteretic material. Magnetization of the hysteretic material by the permanent magnets results in continuous stability positions. In this case, besides a torque limiting effect, also a dampening effect is obtained after the resistance thresholds of the magnetic coupling have been exceeded. The lack of rigidity of the system allows compensating mechanical clearances.

The invention can be applied in different technical fields, including moving an encoder-like rotating member on a shaft that simultaneously rotates and translates or in roto-translating pistons of capping heads for applying for instance screw or pressure caps to containers, more particularly bottles.

Figure 6:
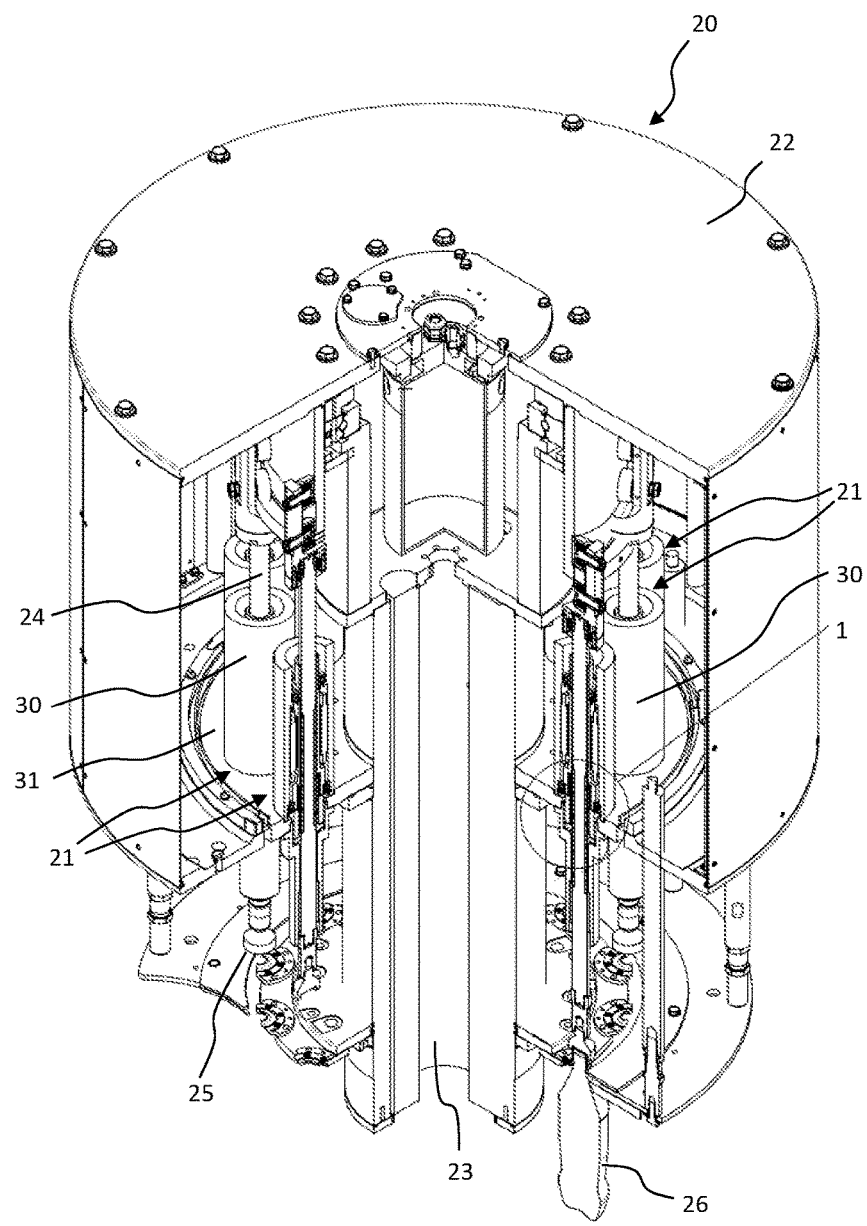
FIG. 6 shows a turret of a capping machine with a plurality of capping heads using the roto-translating coupling device according to the invention.
Figure 7:
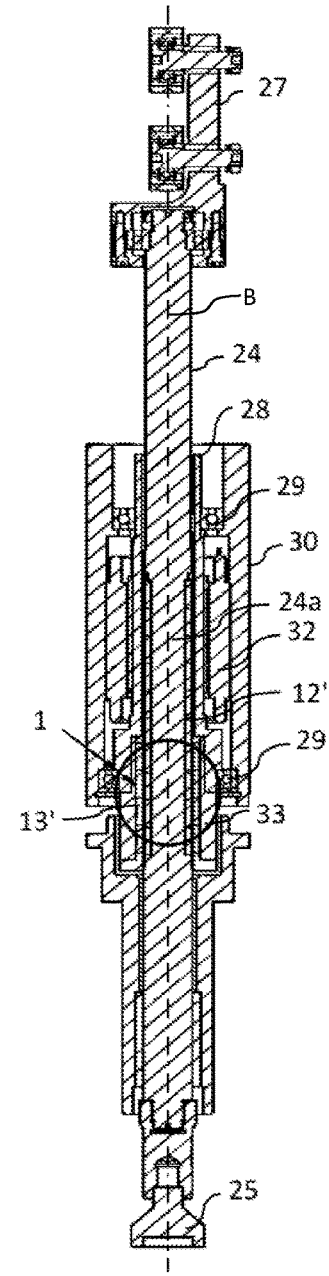
FIG. 7 is a longitudinal sectional view of a capping head of the turret shown in FIG. 6.

FIGS. 6 to 8 show the application of coupling device 1 according to the invention in one of such capping machines. As known, a capping machine generally comprises at least one capping head, in turn including a cap application part, having a cap gripping member which is generally made to move according to a rotary movement about a longitudinal axis and a translatory movement along said axis, and a driving part, for instance located axially above the cap application part. The axial sliding of the gripping member also serves for applying a top load necessary to keep the container to be capped blocked during the capping operation. In conventional heads, one or more springs allow adjusting such a load.

More particularly, FIG. 6 shows, by way of example, a capping turret 20 preferably including a plurality of capping heads 21, each incorporating coupling device 1. Turret 20 includes a stationary frame 22, inside which there is mounted a rotating structure 23, to which heads 21 are fixedly connected for rotation. Rotation of structure 23 allows bringing capping heads 21 in correspondence of bottles 26. The means for causing rotation of structure 23 are conventional and are not shown.

Referring also to FIG. 7, each head 21 is configured as a piston with a rod 24, which is to be driven into the roto-translatory motion necessary for the capping operations and which carries, at its bottom, gripping member 25 for the cap to be applied to a bottle 26. At its top, rod 24 is provided with means 27 for connection to members belonging to the driving part (not shown) and causing the axial sliding of the rod under the control, for instance, of cams. Reference symbol B denotes the axis of rotation of rod 24.

A central portion of rod 24 is coaxially inserted into a sleeve 28 rotatably mounted, as indicated by bearings or bushings 29, in a cylindrical body 30 fixedly connected for rotation to rotating structure 23 of turret 20. More particularly, cylindrical bodies 30 of all heads are fastened to a flange 31 in structure 23. Cylindrical body 30 is open at both bases to allow translation of rod 24. Cylindrical body 30 accommodates stator 32 of an electric motor for generating the rotary motion to be imparted to rod 24 through magnetic coupling device 1 according to the present invention. Sleeve 28 forms the rotor of said electric motor.

In that central portion, rod 24 has a portion 24a of reduced diameter, which is intended to form the inner rotor of a magnetic coupling device 1 (FIGS. 1 to 4) and to which the magnets are therefore applied. Advantageously, as shown in FIG. 8, rod 24 has a plurality of parallel longitudinal rows of elongated permanent magnets 12', the ends of which are offset so that they do not lie on a same circumference perpendicular to the axis of rod 24. That is, the magnet arrangement depicted in FIG. 3 has been adopted, in order to allow a continuous sliding of rod 24.

Opposite the rows of magnets 12' there are located the rows of magnets 13' of the outer rotor of the coupling device, which rotor consists of an element 33 fixedly connected to sleeve 28 and it too coaxial with rod 24. Advantageously, outer magnets 13' are offset relative to magnets 12' applied to rod 24.

The operation of head 21 is as follows.

As known, when a cap is to be applied to a bottle 26, it is necessary to impart a roto-translatory motion to rod 24 of head 21 concerned. To this end, the electric motor located in cylindrical body 30 is actuated, thereby causing rotation of element 33 about axis B. At the same time, rod 24 is made to slide along axis B by the driving part. Substantially until the moment of the contact between cap gripping member 25 and bottle 26, and more particularly until the moment of cap tightening, the torque applied by outer rotor 33 to rod 24 is lower than the maximum torque having been set, and rod 24 and sleeve 28 (to which outer rotor 33 of the coupling device is fixedly connected) jointly rotate. At the moment of the engagement with bottle 26, and because of the cap tightening, the maximum torque and force are exceeded, and rod 24 stops rotating relative to sleeve 28, but it may continue translating relative to the sleeve with a continuous movement, thereby applying the top load. When the rows of magnets 12' in portion 24a of rod 24 reach the ends of the rows of magnets 13' of outer rotor 33, sliding is stopped and the device acts as a spring, thereby adjusting the top load.

It is clear that the above description is given only by way of non-limiting example and that changes and modifications are possible without departing from the scope of the invention as defined by the appended claims.

For instance, in case of a coupling device for transmitting a roto-translatory motion, it is possible to have three coaxial rotors, of which the innermost rotor and the outermost rotor have a shorter length than the central rotor (and hence have magnets shorter than the magnets in the latter) and are axially slidable relative to the central rotor. With such an arrangement, a common rotation of the three rotors is possible, whereas the translation of the innermost and the outermost rotors could even take place in opposite directions.

Moreover, a hysteresis coupling device could be used also in capping heads 21 of turret 20 in place of a coupling device with synchronous magnets, as shown in FIGS. 6 to 8.

The invention claimed is:

1. A magnetic coupling device (1) for coupling at least a first and a second member (10, 11), coaxial with one another, so that the members can at least perform a joint rotary movement about a common axis (A) or a relative rotary movement, depending on the intensity of a torque applied to one of said members, wherein at least one of said members (10, 11) has axially extending magnetized areas each consisting of a row of axially aligned magnets (12', 13'), wherein, for coupling said first and second members (10, 11) so that the members can perform, in addition to said rotary movements, also a joint translatory movement along said common axis (A) or a relative translatory movement, depending on the intensity of an axial force applied to one of said members, the magnets in the different rows are magnets of the same polarity arranged adjacent to each other in the respective row and the magnets in adjacent rows are of opposite polarity, and wherein the magnets (12', 13') in each row are offset relative to the magnets of an adjacent row so that ends of the magnets of adjacent rows are not aligned to form a circumference perpendicular to the axis (A) of the first and second members (10, 11).

2. The magnetic coupling device in according to claim 1, wherein the members include three members coaxial with one another, wherein an innermost member and an outermost member of the three members are capable of axially translating relative to a central member of the three members, and wherein the axial translation of said innermost and outermost members may take place in opposite directions.

3. The magnetic coupling device (1) according to claim 1, wherein the magnetized areas are provided on the at least two members (10, 11).

4. The magnetic coupling device according to claim 1, wherein one of the at least two members has the magnetized areas (12, 13) and the other one is made of a material having magnetic hysteresis properties.

5. A capping head (21) including a cap application part (24, 25) equipped with a cap gripping member (25) and arranged to move according to a rotary movement about a longitudinal axis (B) and a translatory movement along said axis, and a driving part (27, 28, 32) for said cap application part (24, 25), wherein the driving part (27, 28, 32) is arranged to transmit the rotary and translatory movements to the cap application part (24, 25) through the magnetic coupling device (1) according to claim 1.

6. The capping head (21) according to claim 5, wherein said cap application part (24, 25) includes an axially slidable rod (24) having, in a central region, a portion (24a) of reduced diameter that forms a first one of the coupled members of the magnetic coupling device (1) and is coaxially inserted in a sleeve (28), wherein said sleeve (28) is fixedly connected to an element (33) that is coaxial with said rod (24) and that forms a second one of the coupled members of the magnetic coupling device (1), and wherein said sleeve (28) forms a rotor of an electric motor.

7. A turret (20) of a capping machine, including a plurality of capping heads (21) as claimed in claim 6 mounted on a rotating structure (23) of the turret (20) and fixedly connected for rotation to said structure.

8. The capping head (21) as claimed in claim 6, wherein said sleeve (28) is rotatably and slidably mounted in a housing (30) that is carried by a rotating structure (23) of a turret (20) of a capping machine including a plurality of capping heads (21) and houses a stator (32) of said electric motor.

9. A turret (20) of a capping machine, including a plurality of capping heads (21) as claimed in claim 8 mounted on a rotating structure (23) of the turret (20) and fixedly connected for rotation to said structure.

* * * * *